(12) United States Patent
Gotze et al.

(10) Patent No.: US 8,885,819 B2
(45) Date of Patent: Nov. 11, 2014

(54) FUSE ATTESTATION TO SECURE THE PROVISIONING OF SECRET KEYS DURING INTEGRATED CIRCUIT MANUFACTURING

(71) Applicant: Intel Corporation, Santa Clara, CA (US)

(72) Inventors: Kevin C. Gotze, Hillsboro, OR (US); Jiangtao Li, Beaverton, OR (US); Gregory M. Iovino, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/728,375

(22) Filed: Dec. 27, 2012

(65) Prior Publication Data

US 2014/0185795 A1 Jul. 3, 2014

(51) Int. Cl.
- *G06F 21/00* (2013.01)
- *H04L 9/08* (2006.01)
- *G06F 21/73* (2013.01)
- *G06F 21/44* (2013.01)

(52) U.S. Cl.
CPC ............... *G06F 21/73* (2013.01); *G06F 21/44* (2013.01); *H04L 9/0861* (2013.01)
USPC .................................................. 380/44; 326/8

(58) Field of Classification Search
CPC ........ G06F 21/73; G06F 21/44; H04L 9/0877
USPC .................................................. 380/44; 326/8
See application file for complete search history.

(56) References Cited

U.S. PATENT DOCUMENTS

| 8,418,006 | B1 * | 4/2013 | Trimberger | 714/725 |
| 2002/0129261 | A1 | 9/2002 | Cromer et al. | |
| 2006/0209584 | A1 | 9/2006 | Devdas et al. | |
| 2006/0289658 | A1 * | 12/2006 | Fischer et al. | 235/492 |
| 2008/0279373 | A1 | 11/2008 | Erhart et al. | |

(Continued)

FOREIGN PATENT DOCUMENTS

KR          10-1080511 B1       11/2011

OTHER PUBLICATIONS

Das, Amitabh, et al. "PUF-based secure test wrapper design for cryptographic SoC testing." Proceedings of the Conference on Design, Automation and Test in Europe. EDA Consortium, Mar. 2012.*

(Continued)

*Primary Examiner* — Kambiz Zand
*Assistant Examiner* — Michael Guirguis
(74) *Attorney, Agent, or Firm* — Thomas R. Lane

(57) ABSTRACT

Embodiments of an invention for fuse attestation to secure the provisioning of secret keys during integrated circuit manufacturing are disclosed. In one embodiment, an apparatus includes a storage location, a physically unclonable function (PUF) circuit, a PUF key generator, an encryption unit, and a plurality of fuses. The storage location is to store a configuration fuse value. The PUF circuit is to provide a PUF value. The PUF key generator is to generate a PUF key based on the PUF value. The encryption unit is to encrypt the configuration fuse value using the PUF key. The PUF key and the configuration fuse value are to be provided to a key server. The key server is to determine that the configuration fuse value indicates that the apparatus is a production component, and, in response, provide a fuse key to be stored in the plurality of fuses.

20 Claims, 3 Drawing Sheets

(56) References Cited

U.S. PATENT DOCUMENTS

| | | | |
|---|---|---|---|
| 2010/0085075 A1* | 4/2010 | Luzzi et al. | 326/8 |
| 2010/0127822 A1* | 5/2010 | Devadas | 340/5.8 |
| 2010/0183154 A1* | 7/2010 | Graunke | 380/278 |
| 2011/0055851 A1* | 3/2011 | Potkonjak et al. | 719/318 |
| 2011/0113392 A1* | 5/2011 | Chakraborty et al. | 716/102 |
| 2012/0033810 A1* | 2/2012 | Devadas et al. | 380/46 |
| 2012/0137137 A1* | 5/2012 | Brickell et al. | 713/182 |

OTHER PUBLICATIONS

International Search Report and Written Opinion received for PCT Patent Application No. PCT/US2013/046187, mailed on Sep. 27, 2013, 9 pages.

Suh et al. "Physical Unclonable Functions for Device Authentication and Secret Key Generation", DAC 2007, Jun. 4-8, 2007, 6 pages.

* cited by examiner

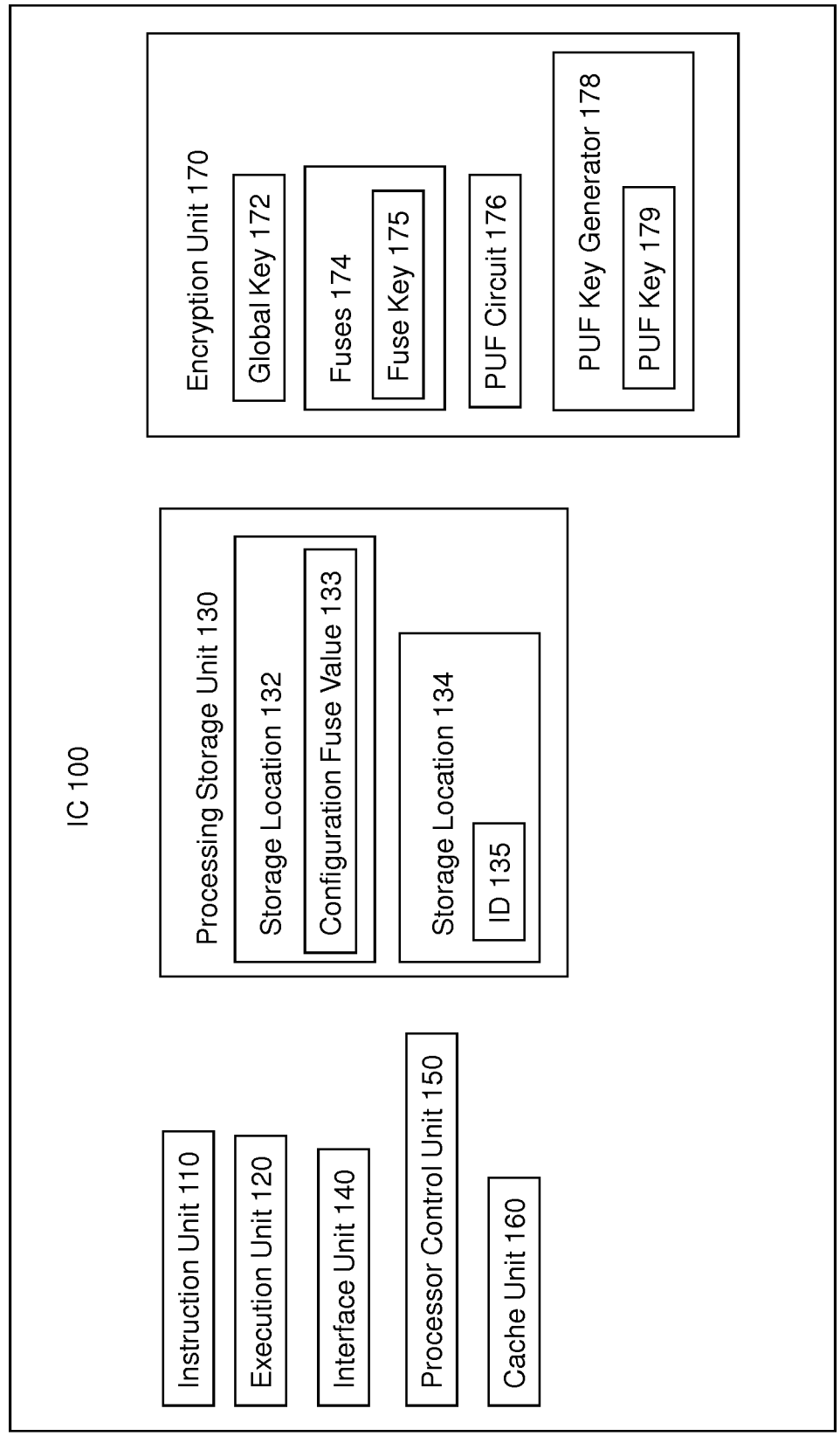

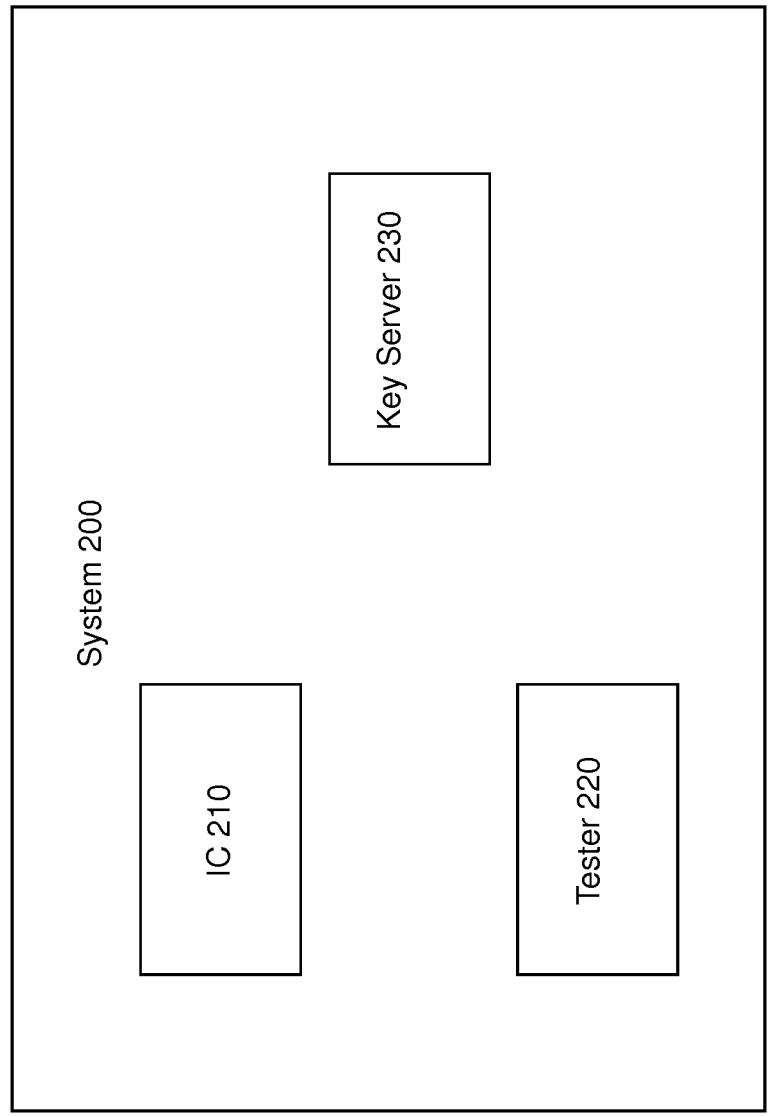

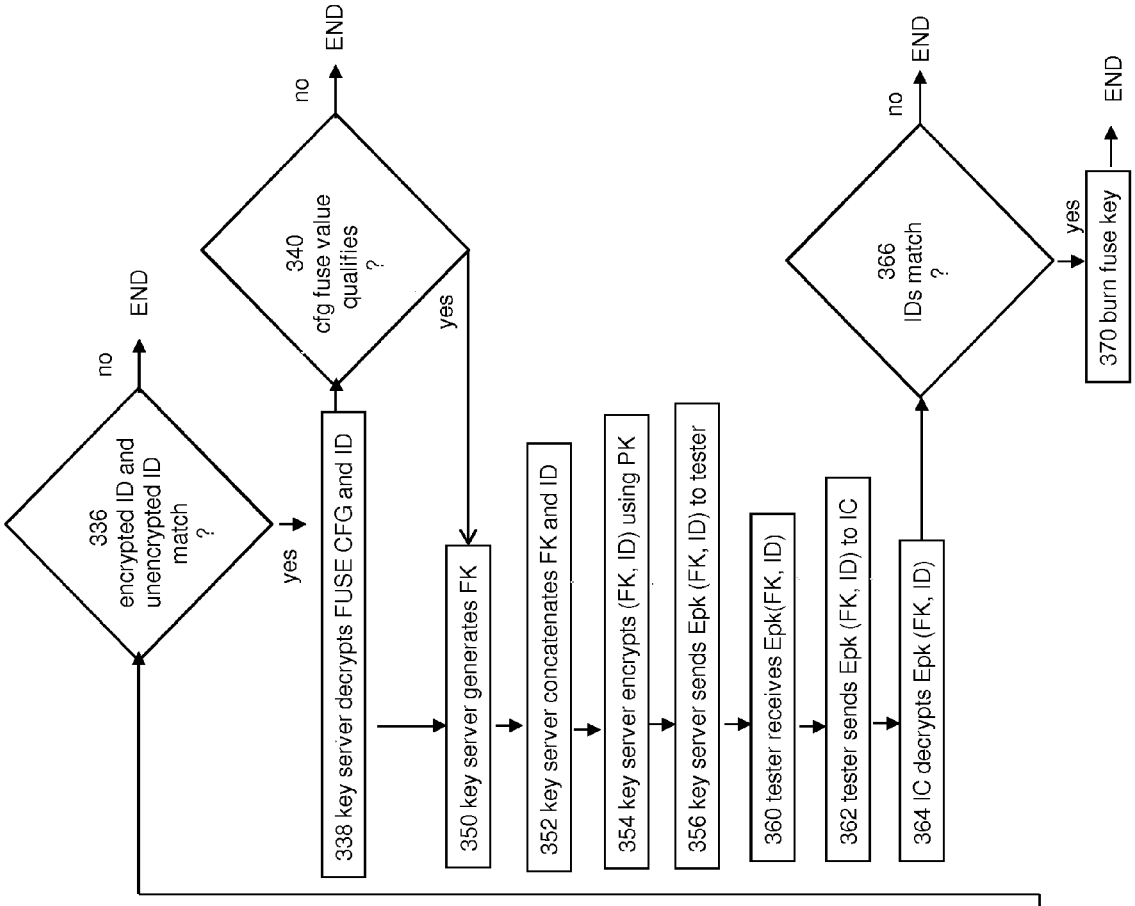

FUSE ATTESTATION TO SECURE THE PROVISIONING OF SECRET KEYS DURING INTEGRATED CIRCUIT MANUFACTURING

BACKGROUND

1. Field

The present disclosure pertains to the field of electronic devices, and more particularly, to the field of security in electronic devices.

2. Description of Related Art

Confidential information is stored, transmitted, and used by many electronic devices. Therefore, many such devices include one or more components having one or more cryptographic or other secret keys, which may be used to protect the security of confidential information with encryption or other techniques. These keys may be programmed into the components, for example with a fuse burning or other one-time programming technique, during a key provisioning step of the manufacturing process.

BRIEF DESCRIPTION OF THE FIGURES

The present invention is illustrated by way of example and not limitation in the accompanying figures.

FIG. 1 illustrates an integrated circuit providing for fuse attestation to secure the provisioning of secret keys during integrated circuit manufacturing according to an embodiment of the present invention.

FIG. 2 illustrates a system providing for fuse attestation to secure the provisioning of secret keys during integrated circuit manufacturing according to an embodiment of the present invention.

FIG. 3 illustrates a method for fuse attestation to secure the provisioning of secret keys during integrated circuit manufacturing.

DETAILED DESCRIPTION

Embodiments of an invention for fuse attestation to secure the provisioning of secret keys during integrated circuit (IC) manufacturing are described. In this description, various specific details, such as component and system configurations, may be set forth in order to provide a more thorough understanding of the present invention. It will be appreciated, however, by one skilled in the art, that the invention may be practiced without such specific details. Additionally, to avoid unnecessarily obscuring the present invention, some well-known structures, circuits, and other features have not been shown in detail.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner.

Also, the terms "bits," "flags," "fields," "entries," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As referred to in the background section, key provisioning may be a step in the manufacturing process of many ICs and other electronic device components. As components flow through this step, some may not need a provisioned production key because they are non-production components, for example, they may be prototype or experimental versions of the component. Programming production keys into these non-production components may be undesirable because these components may have security features disabled, have special features enabled, or otherwise present a risk that a key, keying algorithm, or other keying information might be exposed. Therefore, embodiments of the present invention may provide for verifying that a component is a production component before programming a production key into it.

FIG. 1 illustrates IC 100, which provides for fuse attestation to secure the provisioning of secret keys during integrated circuit manufacturing according to an embodiment of the present invention. IC 100 may represent any other component to be used in any electronic device.

For example, IC 100 may represent one or more processors integrated on a single substrate or packaged within a single package, each of which may include multiple threads and/or multiple execution cores, in any combination. Each processor may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller. IC 100 may include instruction unit 110, execution unit 120, processing storage unit 130, interface unit 140, processor control unit 150, cache unit 160, and encryption unit 170. IC 100 may also include any other circuitry, structures, or logic not shown in FIG. 1. Other embodiments of IC 100 may include all, some, or none of the units shown or described in FIG. 1.

Instruction unit 110 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution unit 120.

Execution unit 120 may include any circuitry, structure, or other hardware, such as an arithmetic unit, logic unit, floating point unit, shifter, etc., for processing data and executing instructions, micro-instructions, and/or micro-operations.

Processing storage unit 130 may represent any type of storage usable for any purpose within IC 100; for example, it may include any number of data registers, instruction registers, status registers, configuration registers, control registers, other programmable or hard-coded registers or register files, or any other storage structures.

Processing storage unit 130 may include storage location(s) 132 which may include any number of bits that may be programmed, with a fuse burning or other one time programming technique, during the manufacturing process to configure various capabilities, features, and other characteristics of IC 100. To provide a basis for referencing it in this description, the result of all such configuring of IC 100 is referred to collectively as configuration fuse value 133. Configuration fuse value 133 may include bits that determine whether IC 100 is a "debug" component (e.g., has special debugging features enabled) and/or has prototype features enabled or disabled, and/or bits that identify whether IC 100 is a production component.

Processing storage unit 130 may also include storage location 134 containing an identifier (ID 135) that may be used to trace IC 100 during the fabrication, assembly, and or test process. Storage location 134 may be part of storage location 132, and ID 135 may be programmed into storage location 134 along with or as part of the programming of configuration fuse value 133, but they are each shown separately in FIG. 1 in order to provide a basis for referencing them in this description.

Interface unit 140 may represent any circuitry, structure, or other hardware, such as a bus unit, messaging unit, or any other unit, port, or interface, to allow IC 100 to communicate with other components through any type of bus, point to point, or other connection, directly or through any other component, such as a memory controller or a bus bridge.

Processor control unit 150 may include any logic, microcode, circuitry, or other hardware to control the operation of the units and other elements of IC 100 and the transfer of data within, into, and out of IC 100. Processor control unit 150 may cause IC 100 to perform or participate in the performance of method embodiments of the present invention, such as the method embodiments described below, for example, by causing IC 100 to execute instructions received by instruction unit 110 and micro-instructions or micro-operations derived from instructions received by instruction unit 110.

Cache unit 160 may include any one or more levels of cache memory in a memory hierarchy of an information processing system, implemented in static random access memory or any other memory technology. Cache unit 160 may include any combination of cache memories dedicated to or shared among any one or more execution cores or processors within IC 100 according to any known approaches to caching in information processing systems.

Encryption unit 170 may include any logic, circuitry, or other hardware to execute one or more encryption algorithms and the corresponding decryption algorithms, some of all of which may be shared with other units of IC 100, such as execution unit 120. Encryption unit 170 may also include global key 172 and fuses 174. Global key 172 may represent any key or other value embedded into IC 100 during manufacturing, such as through the use of metal tie-ups and/or tie-downs. Global key 172 may be shared with other ICs, for example all ICs fabricated from the same mask set or design. Fuses 174 may represent programmable fuses or any other programmable technology that is available for programming during a key provisioning step in order to provide IC 100 with one or more unique or custom keys or other values (fuse key 175).

Encryption unit 170 may also include physically unclonable function (PUF) circuit 176 and PUF key generator 178. PUF circuit 176 may include any number of PUF cells to provide a unique, repeatable, and unpredictable value for PUF key generator 178 to use to generate one or more PUF key(s) 179. For example, PUF circuit 176 may take advantage of variations in IC process parameters such as dopant concentrations and line widths, which may manifest themselves as differences in timing behavior between instances of the same circuit on different ICs. Therefore, each instance of a PUF circuit may provide a unique, repeatable, and unpredictable response when measured or challenged, and cloning or creating a physical copy of an instance of a PUF circuit is difficult. Any type of PUF may be used in PUF circuit 176, including but not limited to an arbiter PUF, a ring oscillator PUF, a static random access memory (SRAM) PUF, and a D-type flip-flop PUF. For example, an SRAM PUF is based on the four-cross coupled transistors of an SRAM cell, which assumes one of two stable states after power-up based on any slight mismatches among the four transistors. The mismatches are the result of variations in the fabrication process, so the power-up state for a single instance of an SRAM cell may be expected to be repeatable, but the distribution of power-up states for a number of instances of an SRAM cell may be expected to be random.

PUF key generator 178 may measure or challenge PUF circuit 176 and use the result to generate one or more unique PUF key(s) 179.

Although FIG. 1 shows storage locations 132 and 134, configuration fuse value 133, and ID 135 within processing storage unit 132, and shows global key 172, fuses 174, fuse key 175, PUF circuit 176, PUF key generator 178, and PUF key 179 within encryption unit 170, any or all may be anywhere else in IC 100 in other embodiments.

FIG. 2 illustrates system 200, which provides for fuse attestation to secure the provisioning of secret keys during integrated circuit manufacturing according to an embodiment of the present invention. System 200 includes IC 210, tester 220, and key management server 230. An embodiment of IC 100 in FIG. 1 may serve as IC 210. Tester 210 may be any piece of equipment for testing ICs that is capable of programming fuses 174. Key management server 230 may be any server, machine, or other entity for provisioning and managing the provisioning of keys, and as such, has access to the value of global key 172.

FIG. 3 illustrates method 300 for fuse attestation to secure the provisioning of secret keys during integrated circuit manufacturing according to an embodiment of the present invention. Although method embodiments of the invention are not limited in this respect, reference may be made to elements of FIGS. 1 and 2 to help describe the method embodiments of FIG. 3.

In box 308 of FIG. 3, IC 210 is powered up on tester 220. In box 310, configuration fuse value 133 may be programmed into IC 210. Although shown in box 310, all or any portion of configuration fuse value 133 may be programmed at any other point in the manufacturing line.

In box 312, PUF circuit 176 assumes its stable state. In box 314, PUF key generator 178 generates PUF key 179 based on the stable state of PUF circuit 176. In box 316, encryption unit 170 encrypts ID 135 and PUF key 179 using global key 172. In box 318, encrypted ID 135 and encrypted PUF key 179, along with unencrypted ID 135, are sent to key management server 230. The purpose of box 318 is to demonstrate to key management server 230 that IC 210 is a genuine component (because it knows global key 172) with a genuine ID and to give key management server 230 its PUF key.

In box 320, IC 210 concatenates configuration fuse value 133 (or the security relevant portion thereof) and ID 135. In box 322, encryption unit 170 encrypts the concatenated value using PUF key 179. In box 324, the encrypted concatenated value along with unencrypted ID 135 is sent to key management server 230. The purpose of box 324 is to prove to key management server 230 that the IC having that particular ID and PUF key has been programmed with that particular configuration fuse value.

In box 330, key management server 230 receives encrypted ID 135 and encrypted PUF key 179, along with unencrypted ID 135, sent in box 318. In box 332, key management server 230 receives the encrypted concatenation of configuration fuse value 133 and ID 135 along with unencrypted ID 135 sent in box 324. In box 334, key management server 230 decrypts encrypted ID 135 and encrypted PUF key 179 using global key 172.

In box 336, key management server verifies that the encrypted ID matches the unencrypted ID received in box 330. If so, method 300 continues in box 338. If not, method 300 ends after signaling that an error or failure has occurred. In box 338, key management server 230 decrypts concatenated configuration fuse value 133 and ID value using PUF key 179.

In box 340, key management server 230 evaluates configuration fuse value 133 to determine whether it complies with all the rules required for a component of this particular model and/or stepping to qualify for a production fuse key. If so, method 300 continues to box 350. If not, method 300 ends after optionally signaling that an error or failure has occurred.

In box 350, key management server 230 generates or looks up the fuse key (e.g., fuse key 175) to be provisioned to IC 210. In box 352, key management server 230 concatenates fuse key 175 with ID 135. In box 354, key management server 230 encrypts the concatenated value using PUF key 179. In box 356, key management server 230 sends the encrypted concatenated value, along with unencrypted ID 135, to tester 220.

In box 360, tester 220 receives the encrypted concatenated value including fuse key 175, along with unencrypted ID 135. In box 362, tester 220 sends the encrypted concatenated value to IC 210. In box 364, IC 210 decrypts the encrypted concatenated value using PUF key 179. In box 366, IC 220 checks whether its ID matches the ID in the concatenated value. If so, then method 300 continues to box 370. If not, method 300 ends after optionally signaling that an error or failure has occurred.

In box 370, fuse key 175 is burned into fuses 174.

In various embodiments of the present invention, the method illustrated in FIG. 3 may be performed in a different order, with illustrated boxes combined or omitted, with additional boxes added, or with a combination of reordered, combined, omitted, or additional boxes. For example, boxes 318 and 324 may be performed together. In another embodiment, boxes 364 and 366 may be omitted; then in box 370, the encrypted concatenated value received in box 360 may be burned into fuses 174. Furthermore, many other method embodiments are possible within the scope of the present invention.

Thus, embodiments of an invention for fuse attestation to secure the provisioning of secret keys during integrated circuit manufacturing have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
    a first storage location to store a configuration fuse value;
    a physically unclonable function (PUF) circuit to provide a PUF value;
    a PUF key generator to generate a PUF key based on the PUF value, where the PUF key is to be provided to a key server;
    an encryption unit to encrypt the configuration fuse value using the PUF key, wherein the encrypted configuration fuse value is to be provided to the key server; and
    a plurality of fuses in which to store a fuse key provided by the key server in response to the key server determining that the configuration fuse value indicates that the apparatus is a production component.

2. The apparatus of claim 1, further comprising a second storage location to store an identifier to be provided to the key server.

3. The apparatus of claim 2, further comprising a third storage location to store a global key, and wherein the encryption unit is also to encrypt the PUF key using the global key prior to providing the PUF key to the key server.

4. The apparatus of claim 3, wherein the encryption unit is also to encrypt the identifier using the global key prior to providing the identifier to the key server.

5. The apparatus of claim 3, wherein the encryption unit is also to decrypt the fuse key using the PUF key.

6. A method comprising:
    encrypting a configuration fuse value of an integrated circuit with a physically unclonable function (PUF) key;
    providing the encrypted configuration fuse value to a key server;
    programming a fuse key into the integrated circuit, wherein the fuse key is provided by the key server in response to the key server determining that the configuration fuse value indicates that the integrated circuit is a production component.

7. The method of claim 6, further comprising generating the PUF key based on a stable state of a PUF circuit.

8. The method of claim 6, further comprising encrypting, using a global key, an identifier of the integrated circuit.

9. The method of claim 8, further comprising providing the encrypted identifier to the key server.

10. The method of claim 6, further comprising encrypting, using a global key, the PUF key.

11. The method of claim 10, further comprising providing the encrypted PUF key to the key server.

12. The method of claim 6, further comprising concatenating the configuration fuse value, prior to encrypting, with an identifier of the integrated circuit.

13. The method of claim 6, further comprising receiving the fuse key from the key server after the key server has encrypted the fuse key using the PUF key.

14. The method of claim 13, further comprising decrypting the fuse key using the PUF key.

15. The method of claim 6, further comprising receiving the fuse key from the key server after the key server has concatenated the fuse key with an identifier of the integrated circuit.

16. The method of claim 6, further comprising receiving the fuse key from the key server after the key server has concatenated the fuse key with an identifier of the integrated circuit to generate a concatenation and has encrypted the concatenation.

17. A system comprising:
an integrated circuit including
a first storage location to store a configuration fuse value;
a physically unclonable function (PUF) circuit to provide a PUF value;
a PUF key generator to generate a PUF key based on the PUF value, where the PUF key is to be provided to a key server;
an encryption unit to encrypt the configuration fuse value using the PUF key, wherein the encrypted configuration fuse value is to be provided to the key server; and
a plurality of fuses in which to store a fuse key; and
the key server to provide the fuse key in response to determining that the configuration fuse value indicates that the integrated circuit is a production component.

18. The system of claim 17, further comprising a tester to power-up the integrated circuit for providing the PUF key and the configuration fuse value to the key server.

19. The system of claim 17, wherein the integrated circuit also includes a second storage location to store an identifier to be provided to the key server.

20. The system of claim 17, wherein the integrated circuit also includes a third storage location to store a global key, and wherein the encryption unit is also to encrypt the PUF key using the global key prior to providing the PUF key to the key server.

\* \* \* \* \*